(12) United States Patent
Nakamura

(10) Patent No.: US 8,384,034 B2
(45) Date of Patent: Feb. 26, 2013

(54) BETA RAY DETECTOR AND BETA RAY RECONSTRUCTION METHOD

(75) Inventor: Hidehito Nakamura, Chiba (JP)

(73) Assignee: National Institute of Radiological Sciences, Chiba (JP)

( * ) Notice: Subject to any disclaimer, the term of this patent is extended or adjusted under 35 U.S.C. 154(b) by 342 days.

(21) Appl. No.: 12/679,213

(22) PCT Filed: Sep. 21, 2007

(86) PCT No.: PCT/JP2007/068405
§ 371 (c)(1),
(2), (4) Date: Mar. 19, 2010

(87) PCT Pub. No.: WO2009/037781
PCT Pub. Date: Mar. 26, 2009

(65) Prior Publication Data
US 2010/0308225 A1 Dec. 9, 2010

(51) Int. Cl.
*G01T 1/20* (2006.01)
(52) U.S. Cl. .................................... 250/361 R
(58) Field of Classification Search ............... 250/361 R
See application file for complete search history.

(56) References Cited

U.S. PATENT DOCUMENTS

| | | | | |
|---|---|---|---|---|
| 5,317,158 | A * | 5/1994 | McElhaney et al. | 250/367 |
| 2001/0002844 | A1 * | 6/2001 | Orava et al. | 348/218 |
| 2004/0232344 | A1 * | 11/2004 | Karplus et al. | 250/370.1 |

FOREIGN PATENT DOCUMENTS

| | | | |
|---|---|---|---|
| JP | 5-5066275 | A | 3/1993 |
| JP | 5066275 | * | 3/1993 |
| JP | 2001013250 | A | 1/2001 |
| JP | 2002341036 | A | 11/2002 |
| JP | 2003004866 | A | 1/2003 |
| JP | 2007010332 | A | 1/2007 |

OTHER PUBLICATIONS

Sergey V. Budakovsky et al., "New Effective Organic Scintillators for Fast Neutron and Short-Range Radiation Detection", IEEE Transactions on Nuclear Science, vol. 54, No. 6, Dec. 2007.*

(Continued)

*Primary Examiner* — David Porta
*Assistant Examiner* — Edwin Gunberg
(74) *Attorney, Agent, or Firm* — Griffin & Szipl, P.C.

(57) ABSTRACT

A beta ray detector and a beta ray reconstruction method are capable of achieving consistently high detection efficiency of beta rays in a wider energy region compared to that of a conventional beta ray detector while enhancing energy resolution. The beta ray detector comprises an absorber scintillator disposed to face a subject emitting beta rays and that is made from an absorptive substance exhibiting a high permeability and a high rate of absorption with respect to beta rays, a backscattering scintillator disposed on the backside of the absorber scintillator and that is made from a backscattering substance exhibiting a low permeability and a high rate of backscattering with respect to beta rays, and an energy detector that combines the amounts of beta ray energy absorption simultaneously measured by the two types of scintillators to reconstruct the energy and detection position of the beta rays emitted from the subject.

9 Claims, 9 Drawing Sheets

OTHER PUBLICATIONS

Hidehito Nakamura, "Keiko Kenshutsuho to Chokokando Iryo-yo Hoshasen Kenshutsuki no Kaihatsu," Heisei 18 Nendo Kenkyu Josei The Science and Technology Foundation of Japan, 2007, 02, pp. 20-21.

H. Ejiri et al., The High Sensitivity Beta-Gamma Spectrometer Elegants V for Rare $\beta(e)$ and $\beta\beta(ee)$ Decays, Nuclear Instruments and Methods in Physics Research A302 (1991), pp. 304-314, North Holland.

International Search Report, issued in corresponding application No. PCT/JP2007/068405, completed Oct. 12, 2007, mailed Oct. 23, 2007.

* cited by examiner

Fig. 3
Prior Art
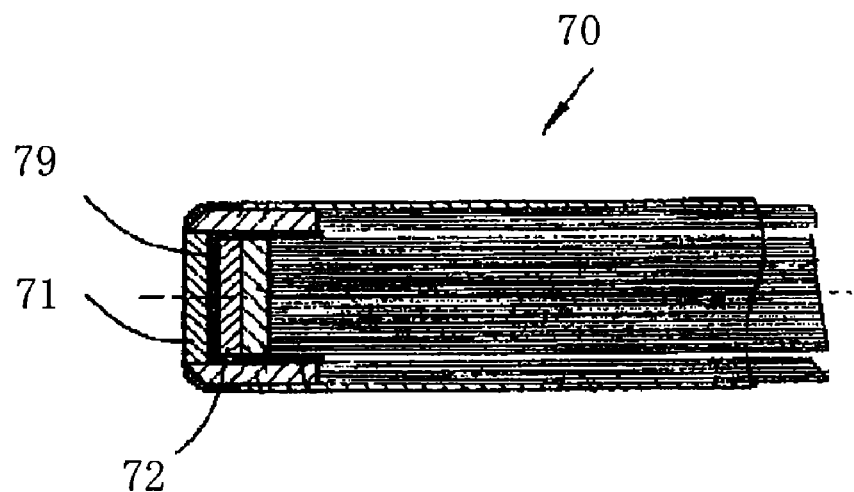
Fig. 4A
Prior Art
Fig. 4B
Prior Art
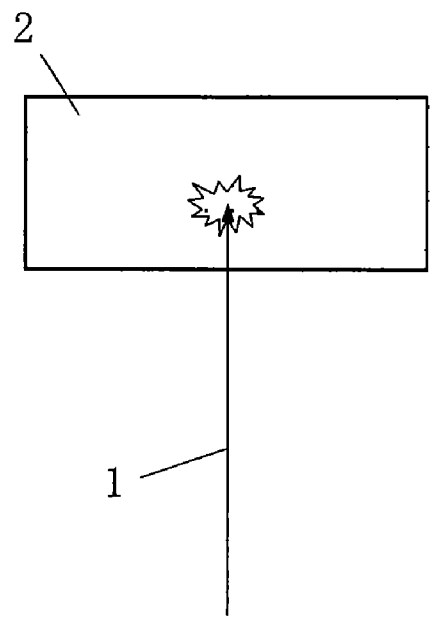
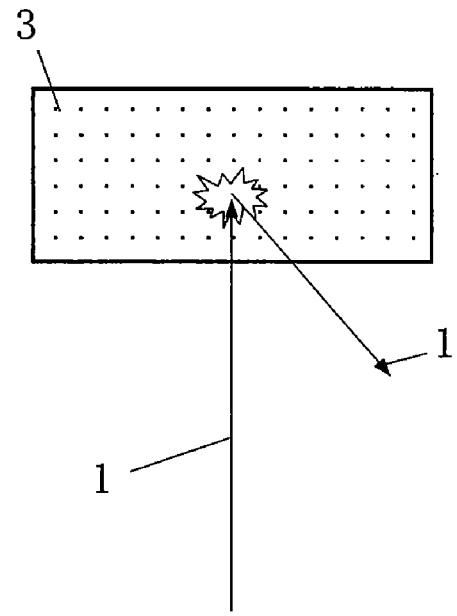

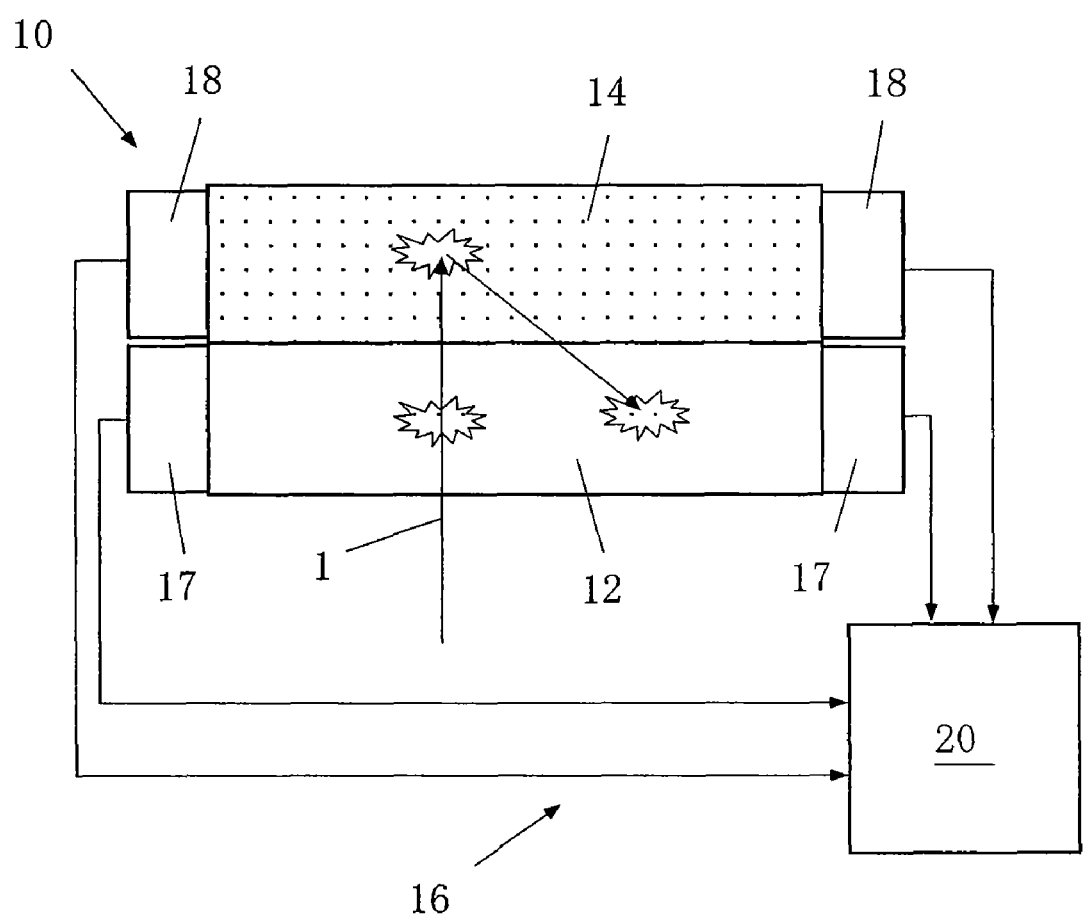

BETA RAY DETECTOR AND BETA RAY RECONSTRUCTION METHOD

This is a National Phase Application in the United States of International Patent Application No. PCT/JP2007/068405 filed Sep. 21, 2007. The entire disclosure of the above patent application is hereby incorporated by reference.

BACKGROUND OF THE INVENTION

1. Technical Field of the Invention

The present invention relates to a radiation detector used in the fields of, for example, nuclear facilities, nuclear medicine diagnosis, atomic physics, and the like, and more particularly, to a beta ray detector and a beta ray reconstruction method.

2. Description of the Related Art

In the fields of, for example, nuclear facilities, nuclear medicine diagnosis, atomic physics, and the like, a radiation detector is used for detecting or measuring alpha rays ($\alpha$ rays), beta rays ($\beta$ rays), and gamma rays ($\gamma$ rays).

A radiation detector for measuring particularly gamma rays ($\gamma$ rays) (the radiation detector will be hereinafter referred to as a "gamma ray detector") is a laminate of a collimator, a NaI (sodium iodide) and a PMT (photomultiplier tube), in which a lead collimator with parallel micropores allows only gamma rays coming from the direction of the pores to reach single crystals of the NaI, whereby fluorescent light is emitted proportional to the amount of gamma ray energy deposited therein, and the PMT detects the light to detect the intensity and the position of the gamma rays.

The above-described gamma ray detector is used for measuring gamma rays ($\gamma$ rays) emitted from radioactive medicines given to a patient in for nuclear medicine diagnosis purposes in a SPECT (single photon emission computed tomography) equipment and a PET (positron emission tomography) equipment.

As an example of the above-described gamma ray detector, proposals have already been made, for example, in Patent Document 1.

On the other hand, a radiation detector for measuring beta rays ($\beta$ rays) (the radiation detector will be hereinafter referred to as a "beta ray detector") is mainly used for detecting the contamination of workers, clothes, equipments, or the like in the nuclear facilities, and proposals have already been made, for example, in Patent Documents 2 and 3.

The gamma ray detector of Patent Document 1 aims to achieve a reduction in weight of a radiation detector and improve directivity and scanning properties, thereby providing accurate detection information.

For this purpose, as illustrated in FIG. 1, the gamma ray detector has a detection portion which is configured of a phoswich detector 51 composed of a plastic scintillator 51a and a CsI (Tl) scintillator 51b, in which gamma rays are incident to the scintillators to emit light pulses which are in turn converted to electric signals by a photoelectric converter 51c. The electric pulses are shaped and amplified by amplifiers 55 and 56 to detect the times of two arbitrary points at the rising parts of the pulses having different attenuation time by a constant fraction method. The time lag between the two points is input to a rise-time-to-height converter 57 converting the time lag to wave height and outputting the same and the light emission pulse of the plastic scintillator 51a is triggered to measure the light emission output of the CsI (Tl) scintillator 51b. That is to say, it is a basic principle that incident $\gamma$ rays and the like are detected only when both of the two scintillators 51a and 51b emit light.

The beta ray detector of Patent Document 2 aims to provide a radiation detector capable of allowing a scintillator with a wide area to function effectively and having a low background count for gamma rays and uniform and high detection efficiency regardless of the incident positions of beta rays.

For this purpose, as illustrated in FIGS. 2A and 2B, the beta ray detector is equipped with a thin board-like scintillator 61 arranged on a measuring surface, a light guide plate 62 attached and optically connected to the backside of the scintillator 61 to guide light, a condensing portion 63 optically connected to each of the side faces of the scintillator 61, a photoelectric conversion element 64 optically connected to the condensing portion 63, and a signal processing circuit 65 connected to the photoelectric conversion element 64.

The beta ray detector of Patent Document 3 aims to provide a radiation detector capable of detecting a radioactive substance existing in a measuring portion based on a signal associated with beta rays when the radioactive substance emits beta rays and other radiation.

For this purpose, as illustrated in FIG. 3, the beta ray detector has a detection portion 70 which is provided with a first scintillator 71 that emits light in response to an incidence of beta rays and other radiation (for example, gamma rays) and a second scintillator 72 that is shielded by a beta ray impermeable substance 79 and emits light in response to an incidence of radiation other than beta rays. Moreover, a calculation portion detects a radioactive substance existing in the measuring portion by a calculation using a signal associated with the first scintillator and a signal associated with the second scintillator.

[Patent Document 1]
Japanese Patent Application Laid-Open No. 5-066275; "Directional Variable Radiation Detector"

[Patent Document 2]
Japanese Patent Application Laid-Open No. 2002-341036; "Radiation Detector"

[Patent Document 3]
Japanese Patent Application Laid-Open No. 2007-010332; "Radiation Detector"

Gamma rays ($\gamma$ rays) are electromagnetic waves having a wavelength shorter than about 10 pm, produced due to a displacement of an energy level within an atomic nucleus and are characterized in that they exhibit extremely high permeability. For this reason, a thick board or a laminated member of an inorganic material (for example, CsI, NaI) through which gamma rays can hardly permeate is generally used as a scintillator of a gamma ray detector.

On the contrary, beta rays ($\beta$ rays) are electrons or positrons which are emitted when an atomic nucleus (neutron) undergoes beta decay and are characterized in that they exhibit extremely low permeability. For this reason, an inorganic material having a high rate of later-described "backscattering" is not used as a scintillator of a beta ray detector, but an organic material (for example, a plastic scintillator) having a high rate of absorption with respect to beta rays is generally used.

The above-described gamma ray detector of Patent Document 1 is the phoswich detector 51 composed of the plastic scintillator 51a and the CsI (Tl) scintillator 51b, and therefore, only the light emission output of the CsI (Tl) scintillator 51b is used for gamma ray detection.

Moreover, the beta ray detector of Patent Document 2 detects only the light emission output of the thin board-like scintillator 61 via the light guiding plate 62.

Furthermore, the beta ray detector of Patent Document 3 detects the radioactive substance existing in the measuring portion from the light emission outputs from both the first scintillator 71 and the second scintillator 72 in a state where areas between the first scintillator 71 and the second scintillator 72 are shielded by the beta ray impermeable substance 79.

For example, when an organic material (for example, a 4 mm-thick plastic) was used as a scintillator for detecting beta rays in an energy range of 0 to 3 MeV, similar to the conventional case, a detection efficiency of 90% or higher was obtained for an energy range of 0 to 1 MeV; however, there is a problem in that the detection efficiency decreases abruptly in an energy range exceeding 1 MeV and becomes 10% or lower in an energy range of 2 MeV, for example.

Moreover, an organic scintillator has a small amount of fluorescence per energy and hence has a low energy resolution compared to an inorganic scintillator.

On the other hand, when an inorganic material (for example, 4 mm-thick NaI) was used as a scintillator, there is a problem in that it is only possible to obtain a detection efficiency of less than 80% over the entire energy ranges of 0 to 3 MeV.

SUMMARY OF THE INVENTION

The present invention is made to solve the above-described problems. That is to say, an object of the present invention is to provide a beta ray detector and a beta ray reconstruction method capable of remarkably increasing a beta ray detection efficiency compared to that of a conventional beta ray detector and increasing the energy resolution, thereby enabling measurement of beta rays in a wide energy region.

In accordance with the present invention, a beta ray detector is provided which comprises: an absorber scintillator which is disposed to face a subject emitting beta rays and is made from an absorptive substance exhibiting a high permeability and a high rate of absorption with respect to beta rays; a backscattering scintillator which is made from a backscattering substance exhibiting a low permeability and a high rate of backscattering with respect to beta rays; and an energy detector which combines the amounts of beta ray energy absorption simultaneously measured by the two types of scintillators to reconstruct the energy and the detection position of the beta rays emitted from the subject, wherein the beta ray detector is capable of achieving consistently high detection efficiency in a wide energy region and providing high energy resolution.

In accordance with a preferred embodiment of the present invention, the backscattering scintillator is disposed on the backside of the absorber scintillator.

Moreover, the absorptive substance is an organic material having a small mass number, consisting of carbon and hydrogen molecules.

Furthermore, the energy detector comprises: an absorption light intensity detector which is optically coupled to the absorber scintillator so as to detect the light intensity of the absorber scintillator; a backscattering light intensity detector which is optically coupled to the backscattering scintillator so as to detect the light intensity of the backscattering scintillator; and a calculator which calculates the amount of energy associated with an identical beta ray from the respective light intensities.

Furthermore, the absorption light intensity detector and/or the backscattering light intensity detector is constructed by a plurality of light intensity detectors which is optically arranged on at least one of the side faces or the backside thereof, and the calculator calculates the incident positions of the beta rays from the light intensity distribution of the plurality of light intensity detectors.

Furthermore, it is preferable that the absorber scintillator is formed of two or more layers of absorptive substance, and that the absorption light intensity detector calculates the incident positions of beta rays from the light intensity distribution of the absorptive substance of each layer to detect the incoming direction thereof.

Moreover, in accordance with the present invention, a beta ray reconstruction method is provided which comprises: arranging an absorber scintillator so as to face a subject emitting beta rays, the absorber scintillator being made from an absorptive substance exhibiting a high permeability and a high rate of absorption with respect to beta rays; arranging a backscattering scintillator which is made from a backscattering substance exhibiting a low permeability and a high rate of backscattering with respect to beta rays; and combining the amounts of beta ray energy absorption simultaneously measured by the two types of scintillators to reconstruct the energy and the detection position of the beta rays emitted from the subject, thereby achieving consistency in high detection efficiency in a wide energy region and providing high energy resolution.

In accordance with a preferred embodiment of the present invention, the backscattering scintillator is disposed on the backside of the absorber scintillator.

Moreover, a plurality of light intensity detectors is optically arranged on at least one of the side faces or the backside of the absorption light intensity detector and/or the backscattering light intensity detector so as to calculate the incident positions of the beta rays from the light intensity distribution of the plurality of light intensity detectors.

Furthermore, it is preferable that the absorber scintillator and the backscattering scintillator are provided on both surfaces of a flat board-like subject emitting beta rays, and that a pair of beta rays simultaneously emitted from both sides of the subject as a result of a double beta decay is simultaneously measured from both surfaces of the subject, and the amounts of energy absorption of the respective beta rays are combined to reconstruct the energy and the detection positions of the pair of beta rays emitted from the subject.

In accordance with the detector and method of the present invention, when the backscattering scintillator is disposed on the backside of the absorber scintillator, the absorber scintillator which is made from the absorptive substance exhibiting a high permeability and a high rate of absorption with respect to the beta rays is disposed so as to face the subject emitting beta rays. Therefore, most (for example, 60%) of the beta rays emitted from the subject is absorbed in the absorber scintillator to emit light, and the remaining portion (for example, 40%) of the beta rays permeates through the absorber scintillator to be incident on the backscattering scintillator disposed on the backside thereof.

Since the backscattering scintillator is made from the backscattering substance exhibiting a low permeability and a high rate of backscattering with respect to beta rays, the incident beta rays will not permeate through the backscattering scintillator, and a portion (for example, 28%) thereof is absorbed therein to emit light and the remaining portion (for example, 12%) will be backscattered to be incident again on the absorber scintillator.

Since the energy of re-incident beta rays is decreased in the absorber scintillator, most (for example, 8%) of the backscattered and re-incident beta rays is absorbed therein to emit light and the remaining portion will permeate out of the system.

Therefore, the amounts of energy absorption of the beta rays simultaneously measured by the two types of scintillators are combined by the energy detector, whereby most (in this example, 96%) of the beta ray energy emitted from the subject can be detected and the beta ray detection efficiency can be remarkably increased compared to that of the conventional beta ray detector.

Similarly, in a case where the backscattering scintillator is not disposed on the backside of the absorber scintillator, by combining the amounts of energy absorption of the beta rays simultaneously measured by the two types of scintillators, it is possible to detect most of the beta ray energy emitted from the subject and remarkably increase the beta ray detection efficiency compared to that of the conventional beta ray detector.

In accordance with the detector and method of the present invention, the energy resolution of the beta rays simultaneously measured by the two types of scintillators becomes an intermediate value of the resolution of a single absorber scintillator and the resolution of a single backscattering scintillator because the energy resolution corresponds to the sum of energies of both scintillators, and therefore, the energy resolution can be increased than that of the single absorber scintillator.

BRIEF DESCRIPTION OF THE DRAWINGS

FIG. 3 is a configuration diagram of the detector described in Patent Document 3.

FIG. 4A is a diagram illustrating the interaction of absorption between a beta ray and a substance.

FIG. 4B is a diagram illustrating the interaction of backscattering between a beta ray and a substance.

FIG. 5 is a configuration diagram illustrating a first embodiment of a beta ray detector of the present invention.

DESCRIPTION OF THE PREFERRED EMBODIMENT

Figure 1:
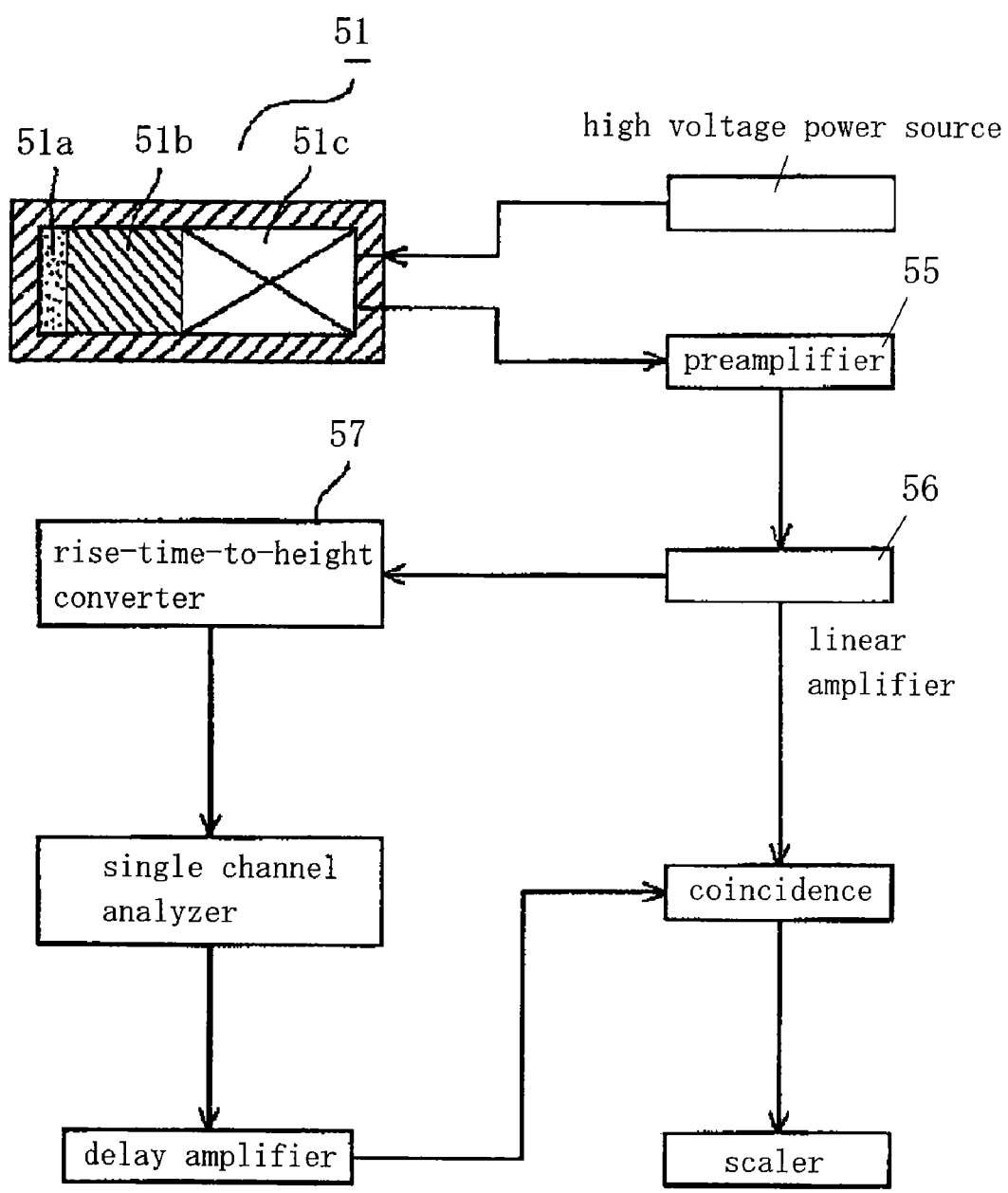
FIG. 1 is a configuration diagram of the detector described in Patent Document 1.
Figure 2A:
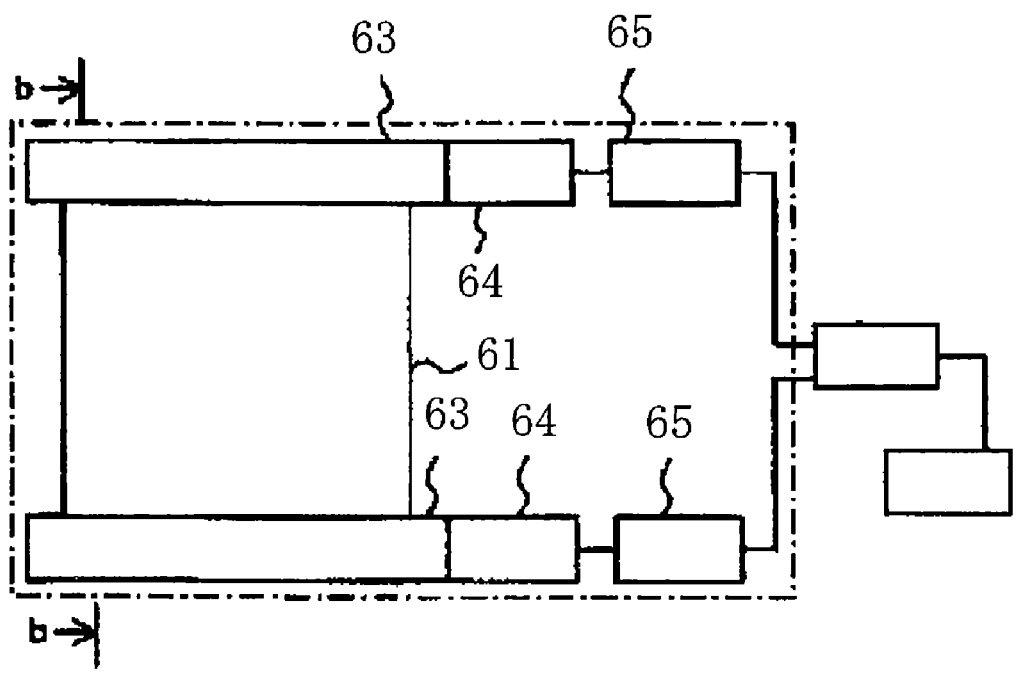
FIG. 2A is a top plan view of the detector described in Patent Document 2.
Figure 2B:
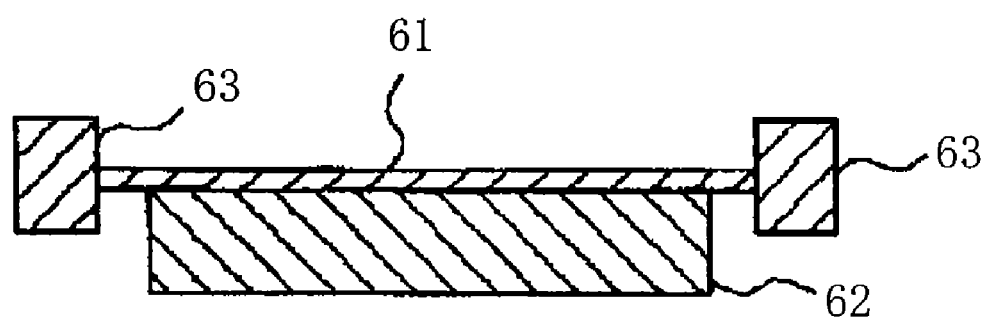
FIG. 2B is a cross-sectional view of the detector described in Patent Document 2.

Preferred embodiments of the present invention will be described hereinbelow with reference to the accompanying drawings. In the respective drawings, the same components or elements will be denoted by the same reference numerals, and the redundant descriptions thereof will be omitted.

The use of radiation sources in nuclear facilities, medical fields, and the like is ever increasing each day. Moreover, even though various safeguard measures are taken on the design and operation of radiation sources, radiation contamination incidents are still occurring. Therefore, a beta ray detector is indispensable for an early and quick detection of the radiation contamination of workers, clothes, equipments, or the like in the nuclear facilities.

The present invention aims to achieve a high resolution beta ray detector for radiation estimation capable of quickly and appropriately identifying exposed persons and urgent workers in a state of emergency such as radiation contamination incidents, thereby improving the image diagnosis technique to shorten the time taken to measure radiation emitted from the human body and the like.

(Interaction of Beta Rays and Substance)

FIGS. 4A and 4B are views illustrating interactions of beta rays and substance which are of importance for developing a beta ray detector for rapid radiation exposure purposes. FIG. 4A illustrates "absorption" of beta rays, in which the beta ray 1 is absorbed in a substance 2 and is deprived of the whole energy thereof. FIG. 4B illustrates backscattering of beta rays, in which the beta ray 1 is deprived of a portion of its energy in a substance 3 and the remaining portion of its energy is "backscattered."

As described above, the interaction of beta rays (electrons) and substance includes an "absorption" process where beta rays are deprived of the whole energy in the substance and a "backscattering" process where beta rays fly out from the surface of the substance with only a portion of its energy being deprived of.

The probability of the backscattering increases with the atomic number of a substance. For this reason, in the conventional beta ray detectors which have been developed, an inorganic scintillator having a large atomic number and a high rate of backscattering has rarely been used, but an organic scintillator having a small atomic number and a low rate of backscattering has been used. However, the organic scintillator has a problem in that it provides poor resolution because of its small amount of fluorescence (light intensity) per energy compared to that of the inorganic scintillator.

In the present invention, the inorganic scintillator and the organic scintillator are combined to make the most of "backscattering," thereby remarkably increasing the detection efficiency and increasing the energy resolution.

Hereinafter, the beta ray detection method according to the present invention will be referred to as "beta ray reconstruction method."

FIG. 5 is a configuration diagram illustrating a first embodiment of a beta ray detector of the present invention.

In the drawing, a beta ray detector 10 according to the present invention is equipped with an absorber scintillator 12, a backscattering scintillator 14, and an energy detector 16.

The absorber scintillator 12 is disposed to face a subject (for example, a human body, a clothes, equipments, and the like; not illustrated) emitting beta rays 1 and is made from an absorptive substance exhibiting a high permeability and a high rate of absorption with respect to the beta rays 1. The energy region of the beta rays 1 is about 0.5 to 3 MeV, for example.

The absorptive substance exhibiting a high permeability and a high rate of absorption with respect to beta rays is an organic material, for example, and particularly preferably is an organic material having a small mass number, consisting of carbon and hydrogen molecules. A plastic scintillator or p-terphenyl is an example of the scintillator of the organic material.

In the later-described example, the rate of absorption of a plastic scintillator with respect to beta rays of 1 MeV is about 95%, and the rate of absorption with respect to beta rays of 2 MeV is about 10%.

The backscattering scintillator 14 is disposed on the backside of the absorber scintillator 12 and is made from a backscattering substance exhibiting a low permeability and a high rate of backscattering with respect to beta rays.

The backscattering substance exhibiting a low permeability and a high rate of backscattering with respect to beta rays is an inorganic material such as, for example, NaI (sodium iodide) and CsI (cesium iodide).

In the later-described example, the rate of backscattering of NaI with respect to beta rays of 1 MeV is about 35% (the rate of absorption is 65%), and the rate of backscattering with respect to beta rays of 2 MeV is about 30% (the rate of absorption is 70%).

In FIG. 5, the beta rays 1 emitted from the subject interact in the absorber scintillator 12, so that a portion of its energy is absorbed therein to emit light. Moreover, the beta rays 1 having permeated through the absorber scintillator 12 are incident on the backscattering scintillator 14 and absorbed therein to emit light. Furthermore, the remaining beta rays are not permeated but backscattered to be absorbed again in the absorber scintillator 12 to emit light.

Since the absorption in the two types of scintillators: the absorber scintillator 12; and the backscattering scintillator 14, occurs simultaneously from the measurement perspective, the measurement is simultaneously performed by the energy detector 16. The energy detector 16 has a function of combining the simultaneously measured amounts of energy absorption of the beta rays 1 to reconstruct the energy and the detection position of the beta rays 1 emitted from the subject.

In the drawing, the energy detector 16 is constructed by an absorption light intensity detector 17, a backscattering light intensity detector 18, and a calculator 20.

The absorption light intensity detector 17 is mounted (optically coupled) on a side face of the absorber scintillator 12 so as to receive light emitted from the absorber scintillator 12 resulting from the absorbed energy of the beta rays 1, thereby detecting the light intensity of the absorber scintillator 12. In this example, although it has a configuration that the entire light intensities are detected by the absorption light intensity detectors 17 on both side faces of the absorber scintillator 12, the absorption light intensity detector 17 may be provided only on one side face or may be provided on four side faces.

The backscattering light intensity detector 18 is mounted so as to be optically coupled to at least one of the side faces or the backside of the backscattering scintillator 14 so as to detect the light intensity of the backscattering scintillator 14 resulting from the absorbed energy of the beta rays 1. In this example, although the backscattering light intensity detectors 18 are provided on both side faces of the backscattering scintillator 14, the backscattering light intensity detector 18 may be provided on a single side face or may be provided on three or four side faces or the backside.

The absorption light intensity detector 17 and the backscattering light intensity detector 18 are constructed by a plurality of light intensity detectors which is optically arranged. The plurality of light intensity detectors which is arranged optically are photomultiplier tubes or a multi-anode photomultiplier tube or a semiconductor detector comprising a plurality of cells, for example.

The calculator 20 is a computer, for example, which receives the respective light intensities of the absorption light intensity detector 17 and the backscattering light intensity detector 18 and performs reconstruction calculation for calculating the total amount of energy from the respective light intensities, assuming that a plurality of coincident inputs, i.e., light intensities, is attributable to identical beta rays 1.

Moreover, by suppressing the occurring frequency of the beta rays 1 from the subject becomes low, it is possible to remarkably decrease the frequency of the beta rays 1 simultaneously occurring from different positions. Therefore, the identification of identical beta rays 1 can be made by determining that the respective light intensities of two or more detectors 17 and 18 measured simultaneously are attributable to the same beta rays 1.

In this example, the calculator 20 is configured to calculate the incident positions of the beta rays 1 from the light intensities detected by a plurality of light intensity detectors. The calculation means will be described later.

(Improvement in Beta Ray Detection Efficiency by Reconstruction Method)

Figure 6:
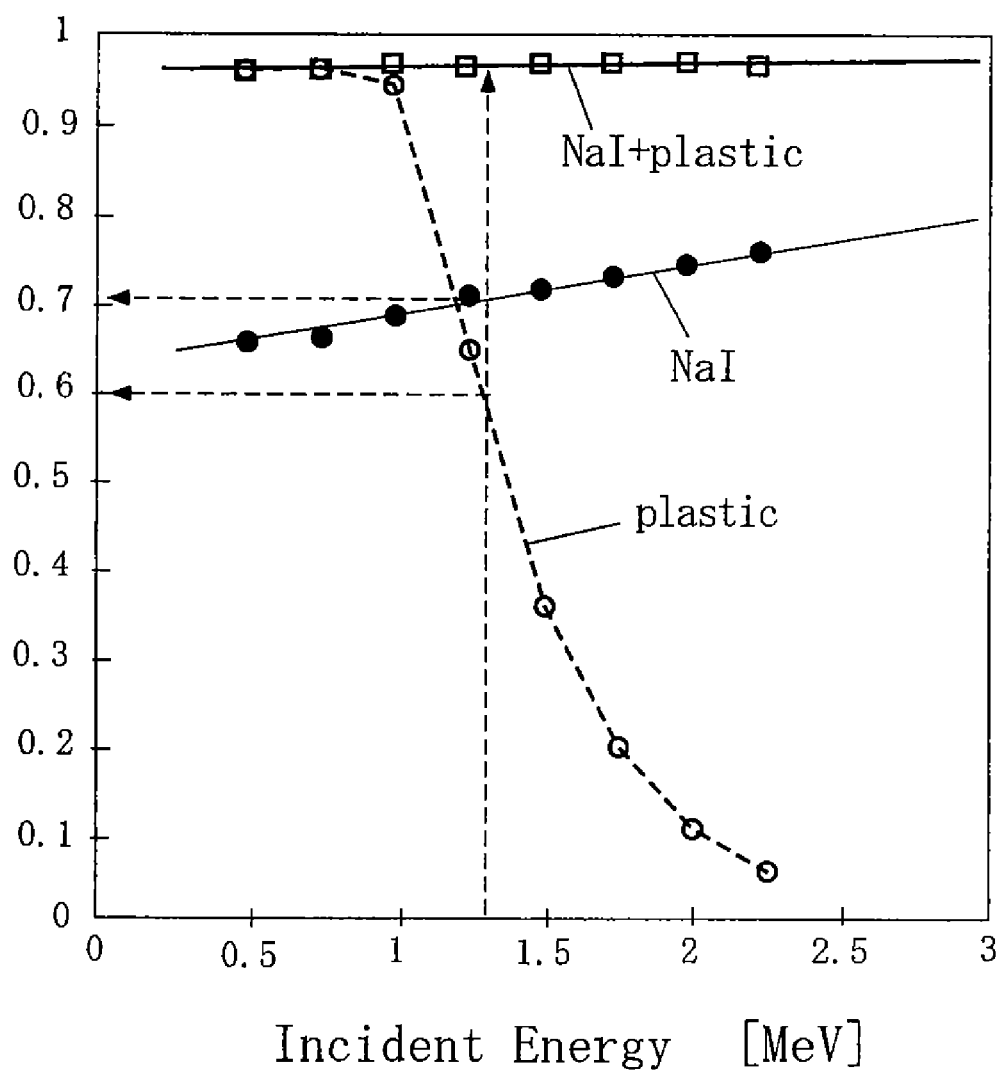
FIG. 6 is a diagram illustrating the relationship between the beta ray energy and the rates of absorption of scintillators.

FIG. 6 is a view illustrating the relationship between the beta ray energy and the rates of absorption of respective scintillators.

In the drawing, the horizontal axis represents the incident beta ray energy, the vertical axis represents the rates of absorption of respective scintillators, and the curves in the drawing correspond to respective cases of a plastic scintillator, a NaI scintillator, and a scintillator (NaI+Plastic) according to the present invention, which are all 4 mm in thickness.

The plastic scintillator is an organic scintillator and corresponds to the above-described absorber scintillator, and the NaI scintillator is an inorganic scintillator and corresponds to the above-described backscattering scintillator.

This example illustrates an improvement in the detection efficiency by the beta ray reconstruction method according to the present invention. In this example, a 4 mm-thick plastic scintillator (hereinafter, referred to as a "fluorescent screen No. 1") is provided on an incidence surface of a NaI detector (hereinafter, referred to as a "fluorescent screen No. 2").

There is an important reason related to an improvement in the energy resolution why the beta rays 1 are directly passed through the absorber scintillator 12 (the fluorescent screen No. 1) without any interruption in the halfway and are then intentionally made incident on the backscattering scintillator 14 (the fluorescent screen No. 2) to be backscattered. The reason will be described below.

Here, the remarkable improvement in the beta ray detection efficiency will be described by an example in which a 4 mm-thick plastic scintillator is used as the fluorescent screen No. 1 and a NaI detector is used as the fluorescent screen No. 2. That is to say, it will be demonstrated that the inorganic scintillator which has not been used because of its low detection efficiency can be used for beta ray detection by using the beta ray reconstruction of the present invention.

Referring to FIGS. 5 and 6, when the energy of the beta rays 1 emitted from the subject is 1.3 MeV, for example, since the absorber scintillator 12 is disposed to face the subject, most (for example, 60%) of the beta rays 1 emitted from the subject is absorbed therein to emit light; and the remaining portion (for example, 40%) thereof permeates therethrough to be incident on the backscattering scintillator 14 disposed on the backside thereof.

Since the backscattering scintillator 14 is made from the backscattering substance exhibiting a low permeability and a high rate of backscattering with respect to beta rays, the incident beta rays will not permeate through the backscattering scintillator 14, and a portion (for example, 28%) thereof is absorbed therein to emit light and the remaining portion (for example, 12%) will be backscattered to be incident again on the absorber scintillator 12.

Since the energy of the re-incident beta rays is decreased in the absorber scintillator 12, the rate of absorption is increased, so that most (for example, 8%) of the backscattered and the re-incident beta rays 1 is absorbed therein to emit light and the remaining portion (for example, 4%) will permeate out of the system.

Therefore, the amounts of energy absorption of the beta rays 1 simultaneously measured by the two types of scintillators 12 and 14 are combined by the energy detector 16, whereby most (in this example, 96%) of the energy of the beta rays 1 emitted from the subject can be detected and the beta ray detection efficiency can be remarkably increased compared to that of the conventional beta ray detector.

As illustrated in FIG. 6, in the plastic scintillator which is the conventional beta ray detector, a detection efficiency of 95% is obtained for an energy range of 0.5 MeV, but the detection efficiency decreases abruptly in an energy range exceeding 0.5 MeV (about 10% in 2.0 MeV). On the contrary, in the present invention, it is possible to obtain consistently high detection efficiency in a wide energy range (in this example, 0 to 3 MeV range).

That is to say, the beta ray detector 10 of the present invention has such a configuration that by using a plurality of fluorescent screens (scintillators 12 and 14), the simultaneously measured energies, one of the beta rays 1 scattered on the fluorescent screen (for example, the backscattering scintillator 14) where interaction occurs and the other of the scattered beta rays are combined together to reconstruct the energy of the original beta rays 1. Owing to such reconstruction, since the respective energies of the beta rays 1 diffused to the respective scintillators are summed together, the detection counts of the beta rays are added and hence the detection efficiency can be improved.

Although the above-described example has been focusing on the energy region (several MeV) of the beta rays which are problematic during the rapid radiation exposure, by changing the "thickness" of the organic scintillator to comply with the energy region to be measured, the beta ray reconstruction method can be used in a wide energy region.

(Improvement in Energy Resolution by Reconstruction Method)

As described above, the organic scintillator has been known to provide poor energy resolution than the inorganic scintillator because it has a small amount of fluorescence (light intensity) per energy. However, the beta ray reconstruction method of the present invention which uses both organic and inorganic scintillators shows that the energy resolution of the organic scintillator can be brought closer to the energy resolution of the inorganic scintillator to the maximum level.

The energy resolution when beta rays incident on a certain scintillator undergoes an energy loss E in the scintillator can be expressed by Equation (1) in Formula 1.

Here, the energy resolutions $a_{Nai}$ and $\sigma_{PL}$ of the NaI detector and the plastic scintillator are expressed by Equations (2) and (3). $E_{NaI}$ and $E_{PL}$ are the energies of the beta rays detected by the NaI detector and the plastic scintillator, respectively.

Here, beta ray reconstruction will be considered when the beta ray having energy $E_\beta$ undergoes an energy loss of $E_{NaI}$ and $E_{PL}$ on the NaI detector and the plastic scintillator, respectively. The energy $E_\beta$ of the incident beta rays can be expressed by Equation (4).

By substituting Equation (4) into Equation (3), the energy resolution $\sigma_{PL}$ of the plastic scintillator can be expressed by Equation (5) using the energy $E_{NaI}$ obtained by the NaI detector.

The energy resolution when the beta ray reconstruction of the present invention is performed becomes Equation (6) by the error propagation method.

Therefore, the relationship between the energy resolutions when the energy $E_\beta$ of beta rays is detected solely by the NaI detector and the plastic scintillator, respectively, and the energy resolution obtainable by the reconstruction becomes Equation (7).

[Formula 1]

$$\sigma(E) = \frac{1}{\sqrt{E}} \quad (1)$$

$$\sigma_{NaI}(E_{NaI}) = \frac{1}{\sqrt{E_{NaI}}} \quad (2)$$

$$\sigma_{PL}(E_{PL}) = \frac{1}{\sqrt{E_{PL}}} \quad (3)$$

$$E_\beta = E_{NaI} + E_{PL} \quad (4)$$

$$\sigma_{PL}(E_\beta - E_{NaI}) = \frac{1}{\sqrt{E_\beta - E_{NaI}}} \quad (5)$$

$$\sigma_\beta^2 = \sigma_{NaI}^2 + \sigma_{PL}^2 \quad (6)$$

$$\sigma_{NaI}(E_\beta) \leq \sigma_\beta(E_\beta) \leq \sigma_{PL}(E_\beta) \quad (7)$$

As will be understood from Equation (7), the reconstructed energy resolution $\sigma_\beta$ becomes an intermediate value of the energy resolution $\sigma_{PL}$ obtained by the single plastic scintillator and the energy resolution $\sigma_{NaI}$ obtained by the single NaI detector.

To put it another way, it shows that by the reconstruction of the present invention, it is possible to bring the energy resolution of the plastic scintillator (organic scintillator) closer to that of the NaI detector (inorganic scintillator) without limit. In other words, by using the beta ray reconstruction of the present invention, it is possible to obtain an energy resolution equal to or higher than that of the organic scintillator which is typically used as the beta ray detector.

Figure 7:
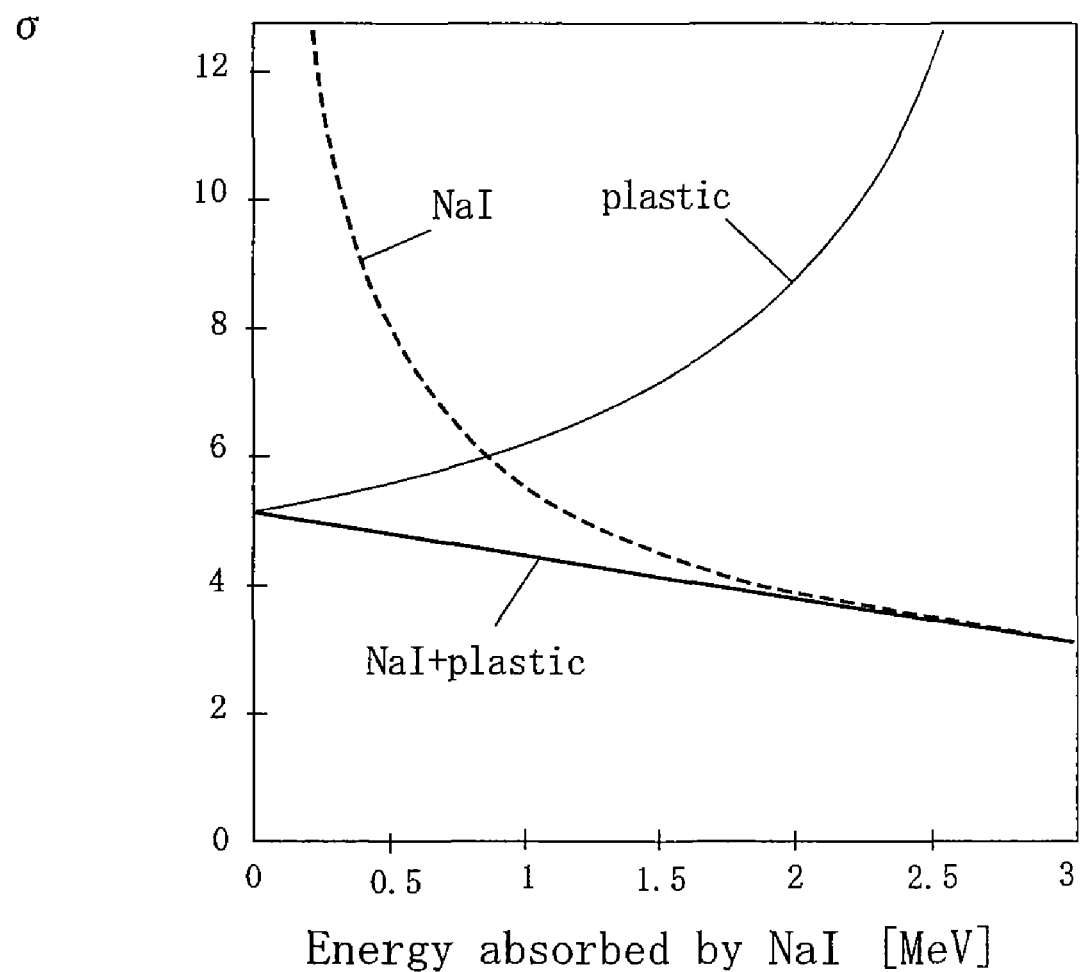
FIG. 7 is a diagram illustrating the principle of improvement in the energy resolution by the beta ray reconstruction according to the present invention.

FIG. 7 is a diagram illustrating the principle of improvement in the energy resolution by the beta ray reconstruction according to the present invention.

In the drawing, the energy of the detected beta ray is 3 MeV, and the horizontal axis represents the energy absorbed by the NaI detector, in which it will be supposed that in an intermediate energy range, the remaining energy is absorbed in the plastic scintillator. The vertical axis represents the energy resolution of each scintillator.

In the plastic scintillator which is the conventional beta ray detector, the energy resolution a is 5.1% in an energy region of 3 MeV. On the contrary, in the present invention, the energy resolution a in the energy region of 3 MeV is increased from 3.3% to 5.1%, which is much higher than the energy resolution of a plastic scintillator which is the existing beta ray detector.

In the drawing, the energy resolutions $\sigma_{NaI}$ and $\sigma_{PL}$ of the NaI detector and the plastic scintillator, and the energy resolution of the detector obtainable by reconstruction are described using Equations (2), (5), and (6).

In FIG. 5, the reason why the beta rays are passed through the organic scintillator 12 and are then made incident on the inorganic scintillator 14 is because the energy resolution is improved by the beta ray reconstruction as illustrated in FIG. 7. This is one of the important keys of the present invention.

(Fluorescence Position Calculation Method)

As a method for calculating a fluorescent source of the scintillators, conventionally a centering method has been used. The centering method is a method of calculating locations by obtaining the center from the ratio of light intensities obtained by detectors (for example, photomultiplier tubes) disposed on the left and right of the fluorescent screen. However, this method can obtain only the "relative position" of the light source (i.e., information on which one of the left and the right detectors has detected fluorescence).

A new analytical method (hereinafter, referred to as "fluorescence position calculation method") for directly calculating the absolute position of the light source unlike the conventional method will be described below. This method can exhibit better performance because the mass number becomes smaller when organic scintillators (for example, plastic scintillators or p-terphenyl) which consist of molecules having a small mass number, such as carbon or hydrogen are used.

Since the organic scintillators have small mass number, the amount of light absorbed during propagation becomes very small, and hence, the distribution of light intensity obtainable from the side faces of the scintillator can be described by the cubic angle of light emitted during fluorescence. In the case of inorganic scintillators having large mass numbers, it is necessary to consider influential factors such as light absorption during propagation or density distribution in the scintillator; therefore, only the case of organic scintillators will be described below.

It should be noted that in principle, the present invention can be applied to the case of inorganic scintillators.

Figure 8A:
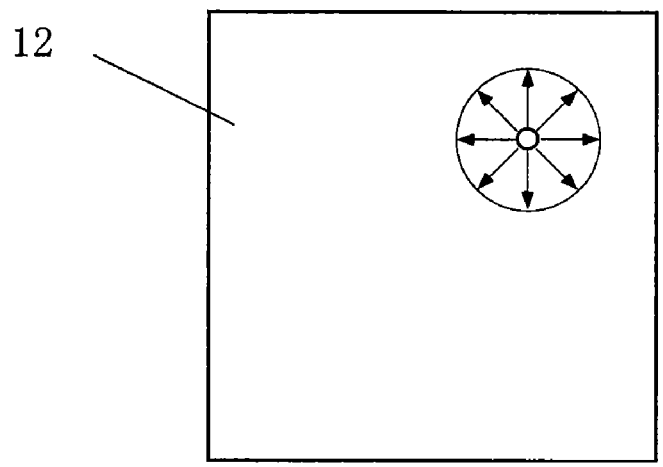
FIG. 8A is a view illustrating the propagation state of light generated on a fluorescent screen.
Figure 8B:
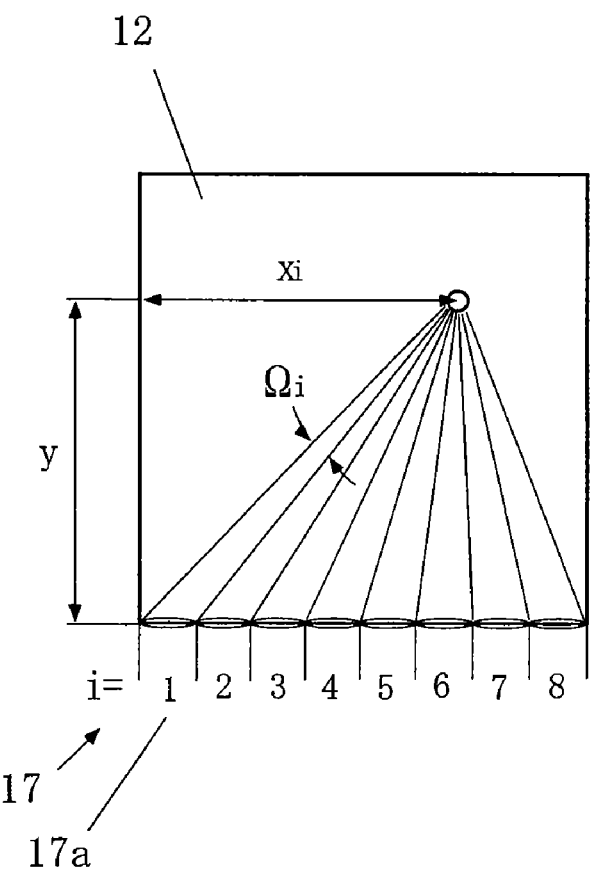
FIG. 8B is another view illustrating the propagation state of light generated on the fluorescent screen.

FIGS. 8A and 8B are views illustrating the propagation states of light generated on a fluorescent screen (absorber scintillator 12). As illustrated in FIG. 8A, light emitted from the fluorescent screen is emitted omni-directionally. Moreover, as illustrated in FIG. 8B, the emitted light reaches a side face (the lower face in the drawing) while repeating total reflection.

In the present invention, in order to obtain light intensity distribution, a plurality of light intensity detectors (for example, photomultiplier tubes or a multi-anode photomultiplier tube or a semiconductor detector comprising a plurality of cells) is provided on the side face (the lower face in the drawing) of the scintillator 12 at predetermined intervals.

In FIG. 8B, although a plurality of light intensity detectors 17a is closely arranged at regular intervals on the side face of the scintillator 12, the plurality of light intensity detectors 17a may be arranged at distant position via optical intervention of optical fibers, for example. Here, i represents the number of each detector. And, $x_i$ represents the distance along the x axis from the light source to the i-th detector, and y represents the distance from the light source to the side face on which the detectors are disposed.

When the light intensity detector 17a (where detectors i of 1 to 8 are arranged at intervals of d) disposed on either side face and having a light-receiving area of a radius r is seen from the light source, the cubic angle $\Omega_i$ can be expressed by Equation (8) in Formula 2.

Here, it is to be noted that in the cubic angle of detectors disposed on the same surface, y do not depend on the location (i=1, 8) of the detectors. Moreover, $x_i$ can be expressed by Equation (9) by using the distance $x_1$ from the light source to the detector (i=1) and the distance d between detectors.

In the case of an organic scintillator having a small mass number, the light intensity $P_i$ measurable with the detector (i) can be described by a cubic angle and therefore can be expressed by Equation (10). Here, A is a proportional coefficient.

By putting Equations (8), (9), and (10), the light intensity distribution obtainable on the side face can be expressed by Equation (11) using three variables (A, $x_1$, y).

By fitting this Equation (11) with respect to the light intensity distribution $P_i$ actually obtained with the detector (i=1, 8), the absolute position ($x_1$, y) of the fluorescence can be calculated.

[Formula 2]

$$\Omega_i = \frac{\pi r^2 \times y}{(x_i^2 + y^2)^{3/2}} \tag{8}$$

$$x_i = x_1 - d(i-1) \tag{9}$$

$$P_i \propto \Omega_i = A \times \Omega_i \tag{10}$$

$$P_i = A \times \frac{\pi r^2 \times y}{((x_1 - d(i-1))^2 + y^2)^{3/2}} \tag{11}$$

Since the above-described fluorescence position calculation method is able to increase the detection accuracy regardless of the detection width of the detector, it is possible to provide a positional accuracy of 1 mm or smaller with less than 10 (for example, 8) light intensity detectors even when the beta ray incidence surface of the backscattering scintillator is increased (for example, 60 mm×60 mm) compared to the conventional one.

If it is possible to detect the respective emission positions in a plurality of scintillators, the incoming direction of the beta rays can be defined 3-dimensionally by connecting the obtained emission positions together in a line. By doing so, it is possible to identify the beta ray occurrence location in the human body.

(Detection of Incoming Direction of Beta Rays)

Figure 9:
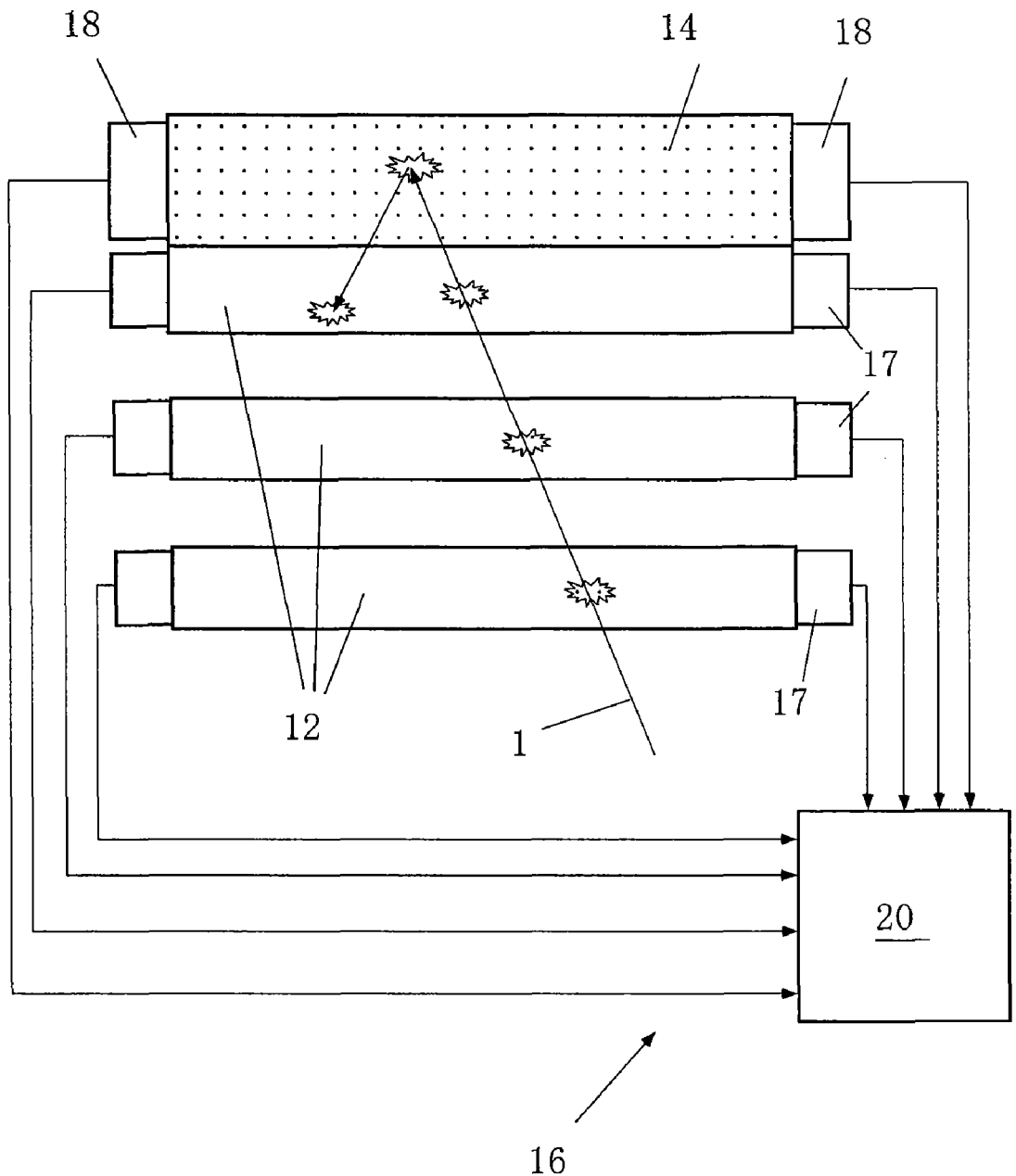
FIG. 9 is a configuration diagram illustrating a second embodiment of a beta ray detector of the present invention.

FIG. 9 is a configuration diagram illustrating a second embodiment of the beta ray detector of the present invention.

The exact incident positions of beta rays (fluorescence occurrence position) can be determined by the above-described fluorescence position analysis method. However, the fluorescence position analysis method cannot detect the incoming direction (the direction) of beta rays.

Therefore, in the second embodiment illustrated in FIG. 9, the absorber scintillator 12 is formed of two or more layers (in this example, three layers) of absorptive substance, and the absorption light intensity detector 17 calculates the incident positions of beta rays 1 from the light intensity distribution of the absorptive substance of each layer of the absorber scintillator 12 to detect the incoming direction thereof.

That is to say, the absorber scintillator 12 (the fluorescent screen No. 1) used in the first embodiment is arranged in multiple layers, and the mutual positions on the respective layers are calculated by the fluorescence position analysis method and connected in one line, thereby detecting the incoming direction of the beta rays 1.

If it is desired to know only the incoming direction, a detector having multiple layers of fluorescent screens No. 1 will suffice. However, as described above, if it is desired to achieve any increase in the energy resolution, it is necessary to make the beta rays 1 incident on the fluorescent screen No. 2 (the backscattering scintillator 14). Therefore, it is important to determine the number of laminated layers or the thickness of each layer considering the energy of the beta rays 1 so that particles are continuously made incident on the fluorescent screen No. 1.

The above-described beta ray detector of the present invention can be used as a high-sensitivity radiation counter for rapid radiation exposure purposes. In this case, the detector may have an arrangement in which a detector (for example, multi-anode photomultiplier tube) is configured into two layers, one layer of a NaI detector (6.2×6.2×1 cm$^3$) and the other layer of a plastic scintillator (6.2×6.2×0.5 cm$^3$) so as to cover at least one or more side faces of a fluorescent screen.

Figure 10:
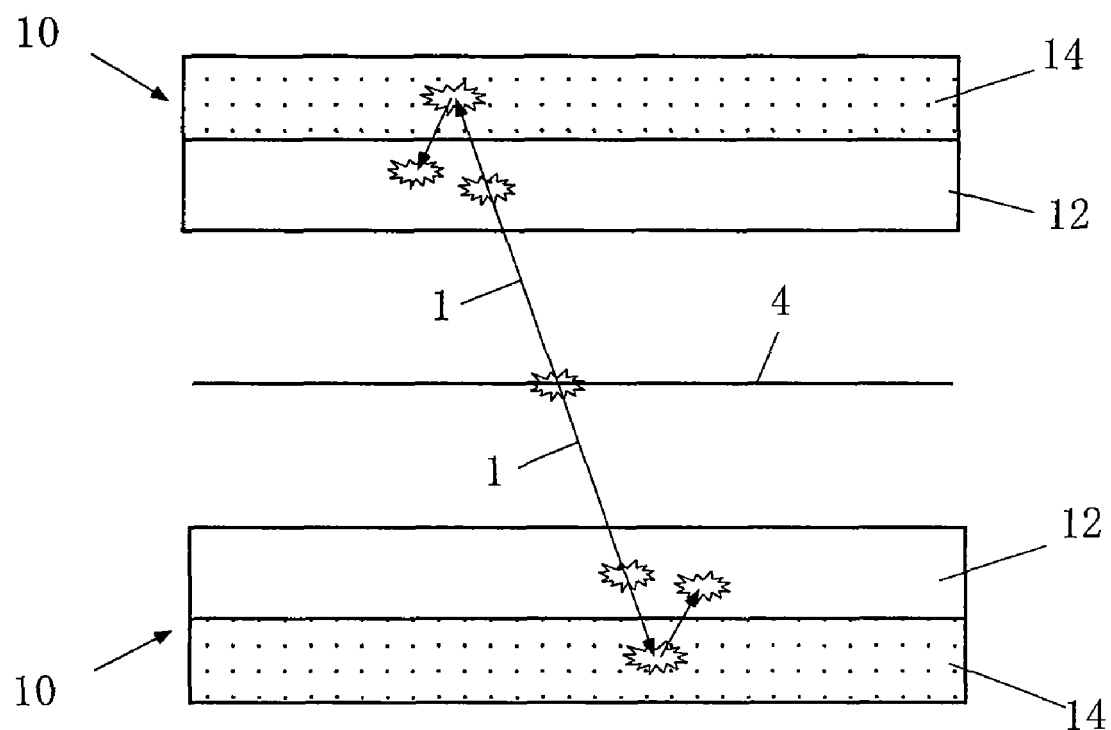
FIG. 10 is a configuration diagram illustrating a third embodiment of a beta ray detector of the present invention.

FIG. 10 is a configuration diagram illustrating a third embodiment of the beta ray detector of the present invention.

In this example, the absorber scintillator 12 and the backscattering scintillator 14 are respectively provided on both surfaces of a flat board-like subject 4 emitting beta rays. In this drawing, the illustration of the energy detector 16 is omitted.

A phenomenon in which two beta decays occur substantially simultaneously is known as a "double beta decay." A double beta decay where no neutrinos are emitted is a phenomenon of which the half-life is extremely long and which occurs once in about 10$^{26}$ years. However, research is being conducted in various countries because observation of this decay can define or explain the neutrino mass, the Majorana particle, the CP Phase, and the like.

To measure this phenomenon, it is important to accurately measure two beta rays resulting from double beta decay. The beta ray reconstruction method of the present invention can be applied to measurement of such a super-rare phenomenon.

As illustrated in FIG. 10, a flat board-like subject 4 comprised of a double beta decay nuclide is interposed between two detectors 10 composed of fluorescent screens No. 1 and No. 2. By measuring two beta rays 1 respectively with the two upper and lower detectors 10, it is possible to measure the double beta decay.

That is to say, a pair of beta rays 1 simultaneously emitted from both sides of the subject 4 as a result of a double beta decay is simultaneously measured from both surfaces of the subject 4, and the amounts of energy absorption of the respective beta rays 1 are combined to reconstruct the energy and the detection positions of the two beta rays 1 emitted from the subject 4, whereby the two beta rays resulting from the double beta decay can be measured accurately.

The energy resolution is of particular importance for measurement of this double beta decay, and by changing (optimizing) the type of organic/inorganic scintillators to comply with a double beta decay nuclide, the measurement can be performed with high sensitivity.

As described above, the beta ray reconstruction method according to the present invention can provide the universality as the basics of radiation measurement used in various fields, for example, subnuclear physics and environmental radiation physics as well as radiation physics and medical physics.

The present invention is not limited to the above-described embodiment but various modifications can be made without departing from the gist of the present invention.

The invention claimed is:

1. A beta ray detector comprising:
    (a) an absorber scintillator disposed to face a subject emitting beta rays, and made from an organic material;
    (b) a backscattering scintillator made from an inorganic material exhibiting a low permeability and a high rate of backscattering as compared to the organic material; and
    (c) an energy detector combining the amounts of beta ray energy absorption simultaneously measured by the absorber scintillator and the backscattering scintillator to reconstruct the energy and the detection position of the beta rays emitted from the subject,
    wherein the energy detector comprises
        i. an absorption light intensity detector optically coupled to the absorber scintillator so as to detect light intensity of the absorber scintillator;
        ii. a backscattering light intensity detector optically coupled to the backscattering scintillator so as to detect light intensity of the backscattering scintillator; and
        iii. a calculator arranged to calculate an amount of energy associated with an identical beta ray from respective light intensities detected by the absorption light intensity detector and the backscattering light intensity detector,
    wherein the absorption light intensity detector and the backscattering light intensity detector are constructed by a plurality of light intensity detectors that are optically arranged at predetermined intervals on at least one of the side faces of the absorber scintillator and the backscattering scintillator, and
    wherein the calculator is arranged to calculate the incident positions of the beta rays from a light intensity distribution of the plurality of light intensity detectors.

2. The beta ray detector according to claim 1, wherein the backscattering scintillator is disposed on a backside of the absorber scintillator.

3. The beta ray detector according to claim 1, wherein the organic material consists of carbon and hydrogen molecules.

4. The beta ray detector according to claim 1,
    wherein the absorber scintillator is formed of two or more layers of absorptive substance, and
    wherein the absorption light intensity detector calculates the incident positions of beta rays from the light intensity distribution of the absorptive substance of each layer to detect the incoming direction thereof.

5. A beta ray reconstruction method comprising the steps of:
    (a) arranging an absorber scintillator so as to face a subject emitting beta rays, wherein the absorber scintillator is made from an organic material;
    (b) arranging a backscattering scintillator made from an inorganic material exhibiting a low permeability and a high rate of backscattering with respect to beta rays as compared with the organic material;
    (c) optically arranging a plurality of light intensity detectors at predetermined intervals on at least one of the side faces of the absorption scintillator and the backscattering scintillator;
    (d) calculating incident positions of the beta rays from a light intensity distribution of the plurality of light intensity detectors; and
    (e) combining the amounts of beta ray energy absorption simultaneously measured by the absorber scintillator and the backscattering scintilla to reconstruct the energy and a detection position of the beta rays emitted from the subject, thereby achieving consistently high detection efficiency in a wide energy region and providing high energy resolution.

6. The beta ray reconstruction method according to claim 5, wherein the backscattering scintillator is disposed on a backside of the absorber scintillator.

7. The beta ray reconstruction method according to claim 5, wherein the absorber scintillator and the backscattering scintillator are provided on both surfaces of a flat board-like subject emitting beta rays, and wherein a pair of beta rays simultaneously emitted from both sides of the subject as a result of a double beta decay is simultaneously measured from both surfaces of the subject, and amounts of energy absorption corresponding to the respective beta rays are combined to reconstruct the energy and the detection positions of the pair of beta rays emitted from the subject.

8. The beta ray reconstruction method according to claim 5, wherein the high detection efficiency is about 96% in a wide energy region of 0 to 3 MeV and the high energy resolution provided is at about 5.1%.

9. The beta ray detector according to claim 1, wherein the beta ray detector achieves a consistently high detection efficiency of about 96% in a wide energy region of from 0 to 3 MeV and provides a high energy resolution at about 5.1%.

* * * * *